Figure 1:
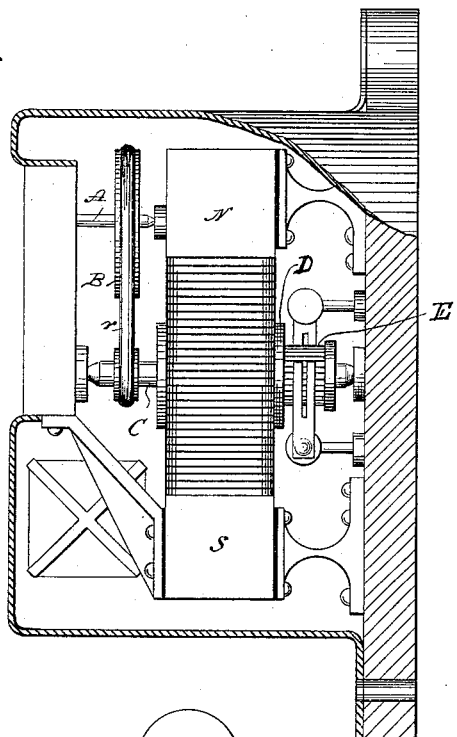

(No Model.)

S. D. MOTT.
ELECTRIC METER.

No. 336,132. Patented Feb. 16, 1886.

WITNESSES:
Geo. Worthington
Thos. Toomey

INVENTOR:
S. D. Mott
BY H. C. Townsend
ATTORNEY

UNITED STATES PATENT OFFICE.

SAMUEL D. MOTT, OF NEW YORK, N. Y., ASSIGNOR, BY DIRECT AND MESNE ASSIGNMENTS, TO THE SCHUYLER ELECTRIC LIGHT COMPANY OF NEW YORK.

ELECTRIC METER.

SPECIFICATION forming part of Letters Patent No. 336,132, dated February 16, 1886.

Application filed August 24, 1883. Serial No. 104,644. (No model.) Patented in England September 29, 1882, No. 4,646.

*To all whom it may concern:*

Be it known that I, SAMUEL D. MOTT, a citizen of the United States, and a resident of New York, in the county of New York and State of New York, have invented certain new and useful Improvements in Electric Meters, of which the following is a specification.

My invention relates to electric meters or instruments for recording or registering the flow of electric currents; and the object I have in view is to make a substantial, accurate, and inexpensive electric meter especially adapted to electric-lighting systems for keeping a registry of the amount of current that passes over a given conductor.

My invention consists in the combination of an electric motor having a constant field, or of an equivalent motor, as hereinafter described, with a train of register-wheels suitably constructed to oppose practically a constant load to the motor, whatever the speed with which they are revolved, and to which said motor is geared, so as to impart movement to the same, varying in amount, for a given unit of time, with the strength of the current by which said motor is driven. It is well known that the speed of an electric motor having a constant load is practically in direct proportion to the current by which it is driven. This is particularly the case with "magnetic motors," so called, or those in which the strength of the field-magnet is always the same, being maintained by means independent of the current traversing the armature, although it is also true of dynamo-electric motors, or those in which the field-magnets and the armature are traversed by the same driving-current. I utilize this principle by connecting the motor directly to a train of registering-wheels without the use of other devices, said train being an ordinary gas-meter train, or any other in which the resistance to revolution is practically the same for all speeds of the prime driven wheel, and said motor being connected to the most rapidly moving wheel of the train, preferably through an intermediate reducing train or mechanism that will reduce the speed, so that the motor may revolve at a very high speed without producing large readings on the register.

I am aware that electric meters have been made in which an electric motor is connected with a register and is made to do work by revolving a vane in a liquid; but in such cases the load is either a variable one with varying speeds, or some special provision or construction has to be adopted for keeping the load constant. I do not make any claim to such arrangement, my invention consisting in the simple combination of the electric motor and the register, pure and simple, all other devices for making a load for the motor or for regulating the load being dispensed with, and the resistance of the register-train itself to revolution when the power is applied to a rapidly-moving portion thereof being relied on to secure the constancy of load despite differences of speed of the motor.

One form of apparatus that may be used for carrying out my invention is shown in the accompanying drawings, in which—

Figure 2:
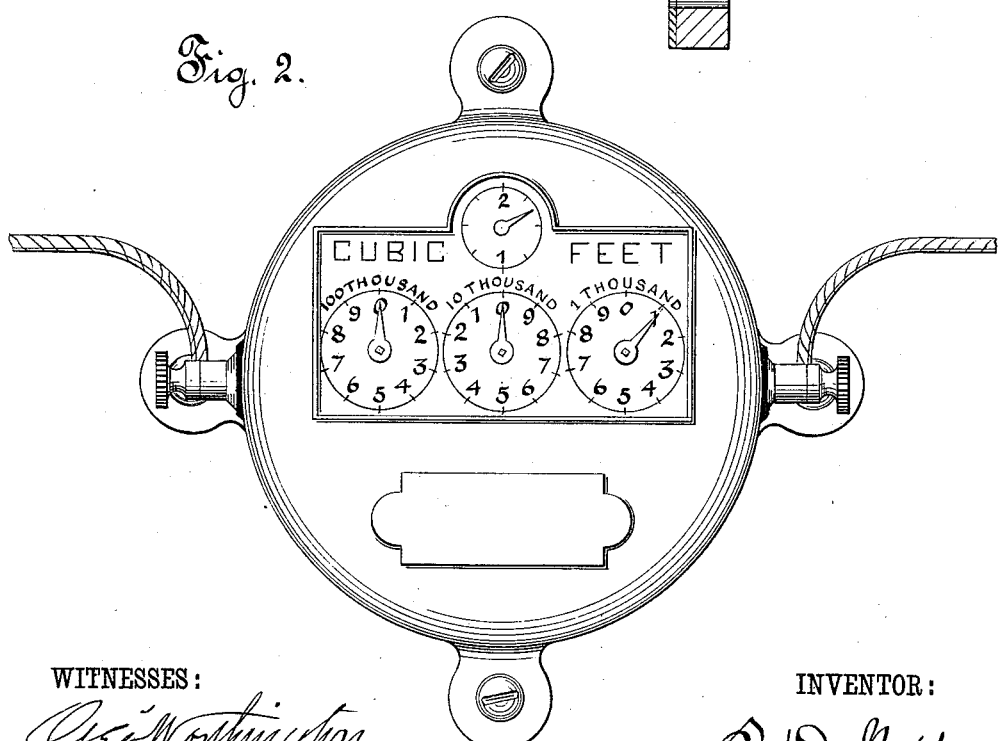

Figure 1 is a side view of the apparatus, the case being shown in section. Fig. 2 is an elevation of the front of the case, showing the dial of the register.

Referring to Fig. 1, A indicates an extension of the spindle or shaft for the prime or most rapidly moving wheel of a register-train—as, for instance, an ordinary gas-meter register—and B indicates a pulley-wheel upon said shaft, driven by a band, $r$, passing over a smaller wheel on the armature-shaft C of an electric motor of any desired kind. The purpose of this arrangement is to reduce the speed of the prime moving wheel of the register, and in practice it would be desirable to still further reduce the speed by the use of suitable intermediate driving-gear—as, for instance, by a worm and screw. My invention is not limited, however, in this respect, and any suitable intermediate gearing might be used, or the motor connected directly to the register-train, the latter being in such case extended by the addition of wheels of higher denomination.

N S indicate the field-magnets for a motor, while D indicates the armature, and E the commutator for said motor. The magnetism of N S may be maintained either by making them permanent magnets or by the use of magnetizing-coils traversed by a current, either that passing through the armature in the well-known way, or one derived from an independent source. I prefer, however, to make the magnetism of the field-magnets independent of the current traversing the armature, for the reason already stated. The armature may be of the well-known Gramme type, or of any other type, preferably such as will have no dead-center. The form of motor is not, however, material, and any form may be used, if provision be made for starting the motor when it is at a dead-center. The dial of the register may be graduated to any desired arbitrary standard. The current is supplied to the motor in the usual way.

The operation is obvious. The motor, being supplied by current from the circuit on which flows the current to be registered, will revolve with a speed varying in proportion to the strength of the current, and as the load is, under the arrangement described, practically constant, no matter what the speed, and the speed is, with a constant load, in direct proportion to the current, the movement given to the registering-wheel will be a correct index of the strength of current upon the circuit.

What I claim as my invention is—

1. The combination, for an electric meter, with an electric motor driven by the current to be measured, and having a magnetic field for its armature, maintained constant despite changes in the current, of a register-train operated by said motor, and constituting by itself the load for said motor.

2. The combination, substantially as described, in an electric meter, of an electric motor having a constant field for its armature, or an equivalent motor, as herein described, a registering-train operated by said motor, and intermediate speed-reducing mechanism, the resistance of said train and mechanism to revolution constituting the only load for said motor.

Signed at New York, in the county of New York and State of New York, this 21st day of June, A. D. 1883.

SAML. D. MOTT.

Witnesses:
 THOS. TOOMEY,
 M. M. FRIEND.